United States Patent
Jones, IV et al.

(10) Patent No.: US 9,935,805 B2
(45) Date of Patent: Apr. 3, 2018

(54) MIMO AND MU-MIMO OFDM PREAMBLES

(75) Inventors: Vincent Knowles Jones, IV, Redwood City, CA (US); Didier Johannes Richard Van Nee, De Meern (NL); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/861,428

(22) Filed: Aug. 23, 2010

(65) Prior Publication Data

US 2011/0051705 A1 Mar. 3, 2011

Related U.S. Application Data (60) Provisional application No. 61/236,815, filed on Aug. 25, 2009, provisional application No. 61/239,152, filed on Sep. 2, 2009.

(51) Int. Cl.
| | |
|---|---|
| *H04J 11/00* | (2006.01) |
| *H04L 27/26* | (2006.01) |
| *H04L 27/34* | (2006.01) |

(52) U.S. Cl.
CPC ........ *H04L 27/2613* (2013.01); *H04L 27/345* (2013.01); *H04L 27/3488* (2013.01)

(58) Field of Classification Search
CPC ................................................. H04W 76/025
USPC ........ 370/203–209, 310, 328–330, 342–345; 375/302, 308, 322, 323, 340
See application file for complete search history.

(56) References Cited

U.S. PATENT DOCUMENTS

| | | | | |
|---|---|---|---|---|
| 7,599,333 | B2* | 10/2009 | Jones et al. | 370/334 |
| 7,715,442 | B2* | 5/2010 | Trainin et al. | 370/503 |
| 7,903,755 | B2* | 3/2011 | Mujtaba | 375/295 |
| 7,974,225 | B2* | 7/2011 | Kasher | 370/310 |
| 8,005,131 | B2* | 8/2011 | Li et al. | 375/220 |
| 8,072,959 | B2* | 12/2011 | Chen | 370/343 |
| 8,126,090 | B1* | 2/2012 | Nabar | 375/340 |
| 8,228,806 | B2* | 7/2012 | Pare et al. | 370/241 |
| 8,238,316 | B2* | 8/2012 | Stacey et al. | 370/338 |
| 8,416,748 | B2* | 4/2013 | Kishigami et al. | 370/334 |
| 8,462,863 | B1* | 6/2013 | Zhang et al. | 375/260 |
| 2005/0174927 | A1* | 8/2005 | Stephens et al. | 370/206 |
| 2006/0193340 | A1 | 8/2006 | Jones et al. | |
| 2008/0075033 | A1* | 3/2008 | Shattil | 370/328 |

(Continued)

FOREIGN PATENT DOCUMENTS

| | | |
|---|---|---|
| JP | 2008502197 A | 1/2008 |
| JP | 2008252867 A | 10/2008 |

(Continued)

OTHER PUBLICATIONS

IEEE P802.11n/D9.0, Draft Standard Logcal and Metropolitan area networks, part 11, amendment 5, IEEE, Mar. 2009, pp. 1-586.*

(Continued)

*Primary Examiner* — Dmitry H Levitan
(74) *Attorney, Agent, or Firm* — Loza & Loza, LLP/Qualcomm (57) ABSTRACT

Certain aspects of the present disclosure present frame structures to support a plurality of standards, such as the IEEE 802.11ac in addition to the IEEE 802.11a/b/n/g. Preamble of the frame structure can be used by a receiver to detect transmission mode of the packet.

27 Claims, 9 Drawing Sheets

| L-STF | L-LTF | L-SIG | V/HT-SIG1 | V/HT-SIG2 | VHT-STF | VHT-LTF1 | VHT-LTF2 | VHT-SIG3 | Data |
|---|---|---|---|---|---|---|---|---|---|

11a/g/n-Legacy portion  ⎧  Precoded 802.11 ac (VHT) portion (56) References Cited

U.S. PATENT DOCUMENTS

2010/0074198 A1 3/2010 Morioka
2011/0317599 A1 12/2011 Takano

FOREIGN PATENT DOCUMENTS

| JP | 2010206730 A | 9/2010 |
|----|--------------|--------|
| JP | 2012518359 A | 8/2012 |
| JP | 2012523774 A | 10/2012 |
| JP | 2013502157 A | 1/2013 |
| WO | WO-2005114874 A1 | 12/2005 |
| WO | WO-2008111496 A2 | 9/2008 |
| WO | 2010095802 A1 | 8/2010 |
| WO | 2010120692 A1 | 10/2010 |
| WO | 2011019571 A1 | 2/2011 |

OTHER PUBLICATIONS

Gesberg, Shifting the MIMO paradigm, IEEE, Sep. 2007, pp. 36-46.*
International Search Report and Written Opinion—PCT/US2010/046497, International Search Authority—European Patent Office—Dec. 1, 2010.
Lanante L, et al., "IEEE802.11ac Preamble with Legacy 802.11a/n Backward Compatibility", IEEE 802.11-YY/0847R0, [Online] Jul. 14, 2009, pp. 1-18, XP002606794, Retrieved from the Internet: URL:http://www.google.de/url?sa=t&source=web&cd=3 &ved=0CBgQFjAC&url=https%3A%2F%2Fmentor.ieee. org%2F802.11%2Fdcn%2F10%2F11-10-0791-02-00ac-pha se-ro-tation-for-the-80-mhz-802-11ac-mixed-mode-packet.ppt &ei=u3bFT07TE8qh4QbZko26Aw &usg=AFQjCNHYliVI8HNnsZmesHd33saVG.
Draft Standard for Information Technology Telecommunications and information exchange between systems. Local and metropolitan area networks Specific requirements Part 11: Wireless LAN Medium Access Control (MAC) and Physical Layer (PHY) specifications Amendment 5 Enhancements for Higher Throughput IEEE P802.11N/D9.0, Mar. 1, 2009, pp. 1,2,276-297, XP002606795. IEEE P802.11n/D9.0 Retrieved from the Internet: URL:http://ieeexplore.ieee.org/stamp/stamp.jsp"tp=&arnumber=4810960 [retrieved on Oct. 25, 2010] p. 278 p. 292 p. 29, 24 pages.
Taiwan Search Report—TW099128312—TIPO—dated May 6, 2013.
European Search Report—EP14020021—Search Authority—Berlin—dated Sep. 26, 2014.
Taiwan Search Report—TW099128312—TIPO—dated May 6, 2015.
Syafei W A, et al., "Design of 600 Mbps MIMO wireless LAN system using GLST coding and its FPGA implementation" Radio and Wireless Symposium, 2009. RWS '09. IEEE, IEEE, Piscataway, NJ, USA, Jan. 18, 2009 (Jan. 18, 2009), pp. 296-299, XP031457393 ISBN: 978-1-4244-2698-0.

\* cited by examiner

MIMO AND MU-MIMO OFDM PREAMBLES

CLAIM OF PRIORITY UNDER 35 U.S.C. §119

The present application for patent claims benefit of U.S. Provisional Patent Application Ser. No. 61/236,815, entitled, "MIMO and MU-MIMO OFDM Preambles," filed Aug. 25, 2009; and U.S. Provisional Patent Application Ser. No. 61/239,152, entitled, "MIMO and MU-MIMO OFDM Preambles," filed Sep. 2, 2009, and assigned to the assignee hereof and hereby expressly incorporated by reference herein.

TECHNICAL FIELD

Certain aspects of the present disclosure generally relate to wireless communications and, more particularly, to design of preambles for multiple input multiple output (MIMO) and multiuser (MU)-MIMO orthogonal frequency division multiplexing (OFDM) systems.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple stations (STAs), concurrent transmissions may occur on multiple channels toward different stations, both in the uplink and downlink directions. Many challenges are presented in such systems. For example, an access point may transmit signals using different standards such as the IEEE 802.11n/a/b/g or the IEEE 802.11ac standards. The receiver should be able to detect the transmission mode of the signal based on the information included in the preamble of the packet.

SUMMARY

Certain aspects of the present disclosure provide a method for wireless communications. The method generally includes generating a frame structure that contains a first portion decodable by a first group of wireless nodes and a second portion decodable by a second group of wireless nodes capable of simultaneous multi-user communication, and transmitting the frame structure to a plurality of devices.

Certain aspects of the present disclosure provide a method for wireless communications. The method generally includes receiving a signal comprising a frame structure, the frame structure containing a first portion decodable by a first group of wireless nodes and a second portion decodable by a second group of wireless nodes capable of simultaneous multi-user communication, and detecting transmission mode of the signal based on information in the received signal.

Certain aspects of the present disclosure provide an apparatus for wireless communications. The apparatus generally includes a circuit configured to generate a frame structure that contains a first portion decodable by a first group of wireless nodes and a second portion decodable by a second group of wireless nodes capable of simultaneous multi-user communication, and a transmitter configured to transmit the frame structure to a plurality of devices.

Certain aspects of the present disclosure provide an apparatus for wireless communications. The apparatus generally includes a receiver configured to receive a signal comprising a frame structure, the frame structure containing a first portion decodable by a first group of wireless nodes and a second portion decodable by a second group of wireless nodes capable of simultaneous multi-user communication, and a circuit configured to detect transmission mode of the signal based on information in the received signal.

Certain aspects of the present disclosure provide an apparatus for wireless communications. The apparatus generally includes means for generating a frame structure that contains a first portion decodable by a first group of wireless nodes and a second portion decodable by a second group of wireless nodes capable of simultaneous multi-user communication, and means for transmitting the frame structure to a plurality of devices.

Certain aspects of the present disclosure provide an apparatus for wireless communications. The apparatus generally includes means for receiving a signal comprising a frame structure, the frame structure containing a first portion decodable by a first group of wireless nodes and a second portion decodable by a second group of wireless nodes capable of simultaneous multi-user communication, and means for detecting transmission mode of the signal based on information in the received signal.

Certain aspects of the present disclosure provide a computer-program product for wireless communications. The computer-program product includes a computer-readable medium comprising instructions executable to generate a frame structure that contains a first portion decodable by a first group of wireless nodes and a second portion decodable by a second group of wireless nodes capable of simultaneous multi-user communication, and transmit the frame structure to a plurality of devices.

Certain aspects of the present disclosure provide a computer-program product for wireless communications. The computer-program product includes a computer-readable medium comprising instructions executable to receive a signal comprising a frame structure, the frame structure containing a first portion decodable by a first group of wireless nodes and a second portion decodable by a second group of wireless nodes capable of simultaneous multi-user communication, and detect transmission mode of the signal based on information in the received signal.

Certain aspects of the present disclosure provide an access point. The access point generally includes a plurality of antennas, circuit configured to generate a frame structure that contains a first portion decodable by a first group of wireless nodes and a second portion decodable by a second group of wireless nodes capable of simultaneous multi-user communication, and a transmitter configured to transmit, via the plurality of antennas, the frame structure to a plurality of devices.

Certain aspects of the present disclosure provide a wireless node. The wireless node generally includes at least one antenna, a receiver configured to receive, via the at least one antenna, a signal comprising a frame structure, the frame structure containing a first portion decodable by a first group of wireless nodes and a second portion decodable by a second group of wireless nodes capable of simultaneous multi-user communication, and circuit configured to detect transmission mode of the signal based on information in the received signal.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
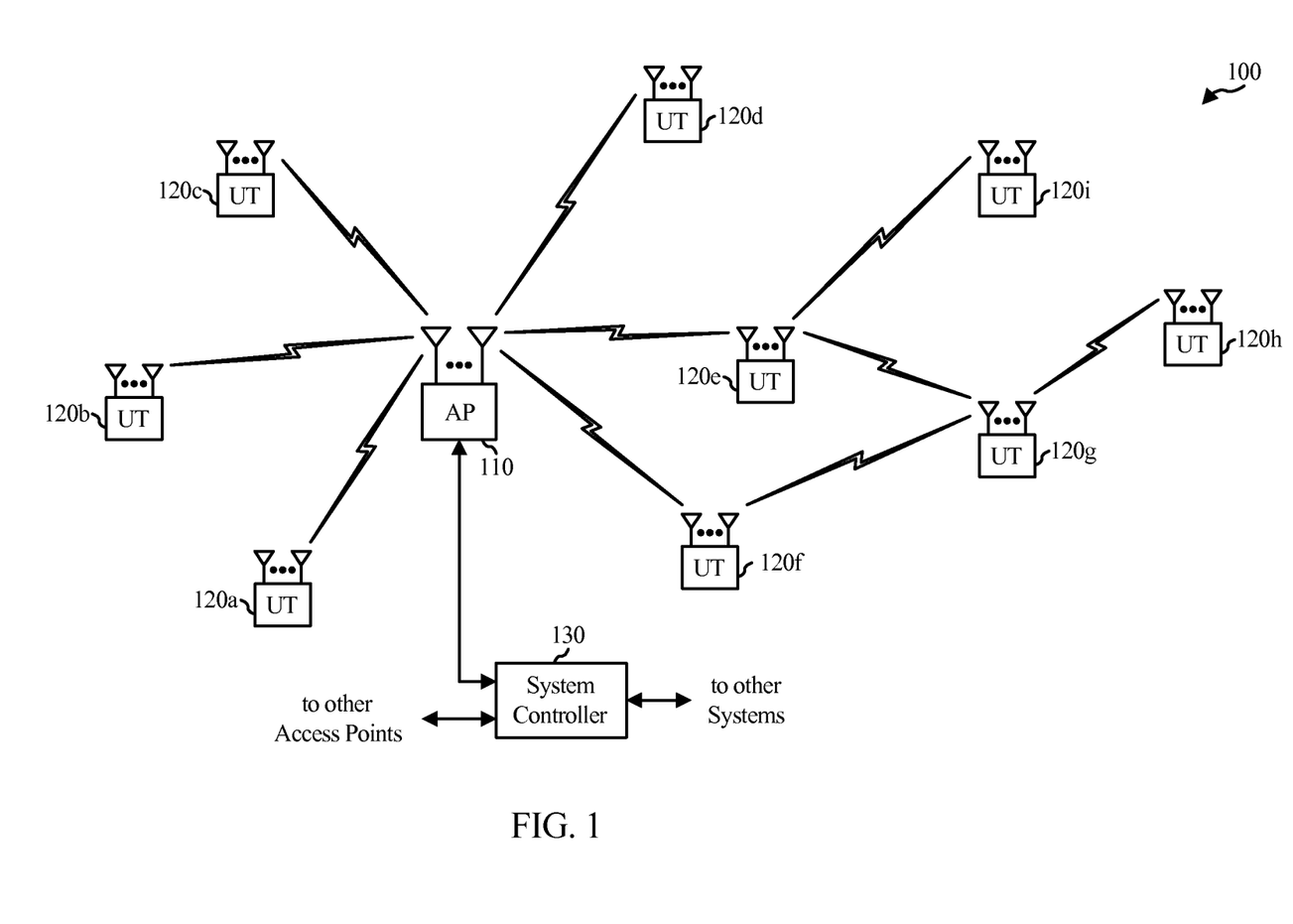
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
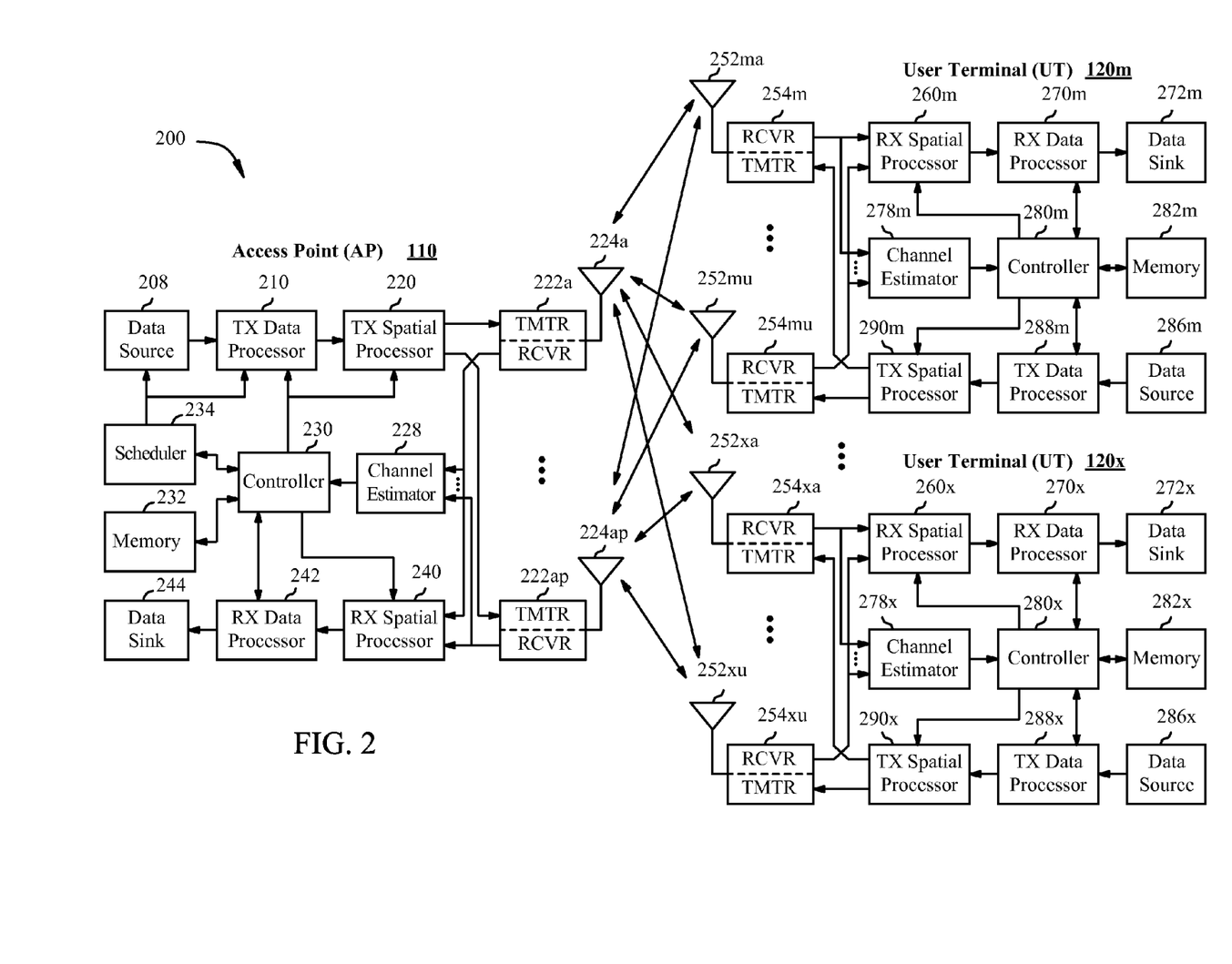
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
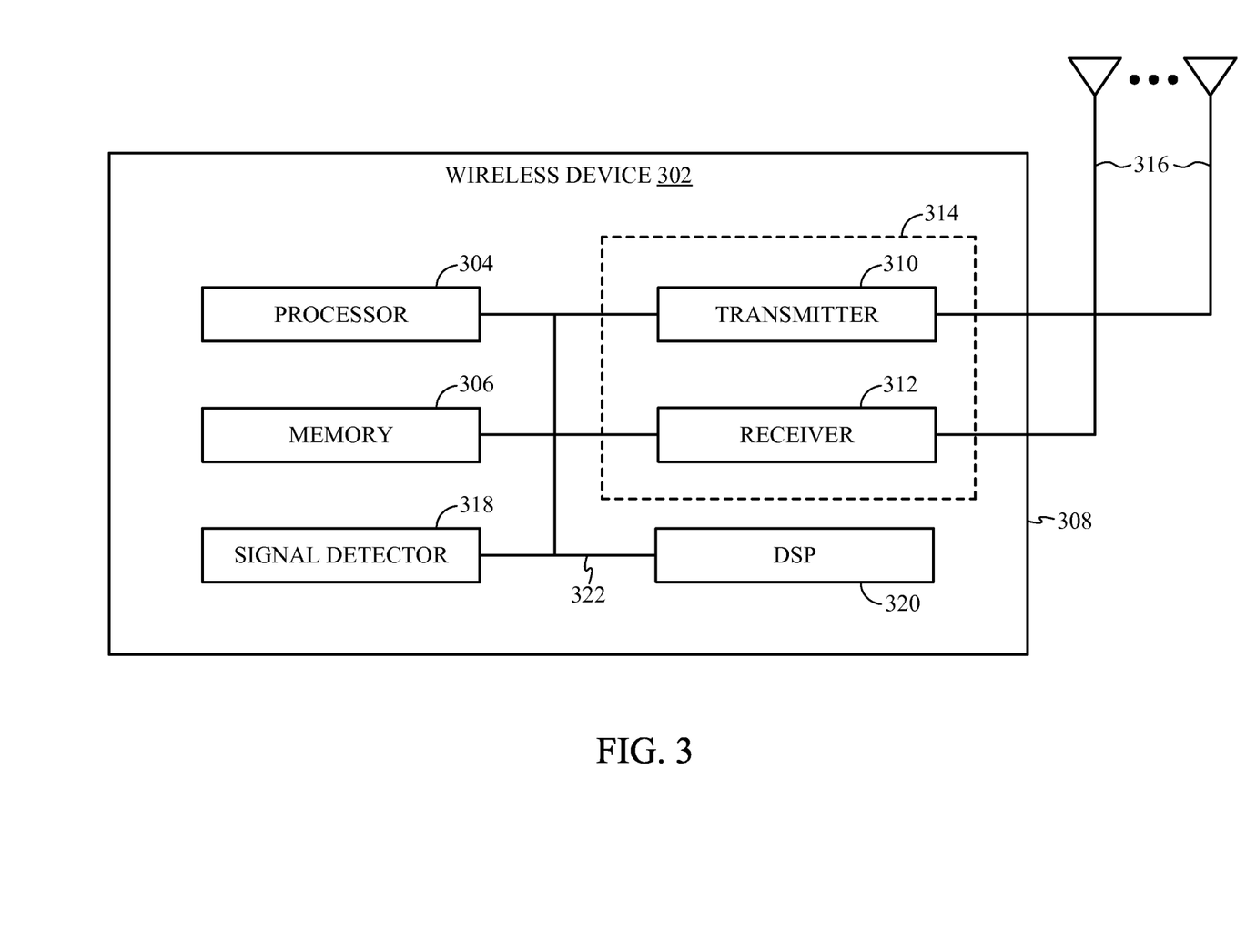
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA, and combinations thereof.

MIMO and MU-MIMO OFDM Preambles

Certain aspects of the present disclosure provide new preamble structures that support additional functionalities beyond the existing wireless local area network (WLAN) functionalities in the IEEE 802.11a/b/g/n standards. The additional functionalities may include support for wider bandwidth signals such as 80 MHz, higher order modulations such as 256QAM (Quadrature Amplitude Modulation), and multi-user spatial processing such as downlink spatial division multiple access (DL-SDMA) and uplink (UL)-SDMA.

In SDMA, data frames may be transmitted to multiple receivers in parallel. The receivers may include new devices that support simultaneous multi-user communication and legacy devices that may only support the IEEE 802.11n/a/g standards. The legacy devices may not support simultaneous multi-user communication such as SDMA and/or multi-user multiple input multiple output (MU-MIMO). One challenge addressed herein is how to generate and send a preamble at the beginning of a data frame to support new features in physical layer while remaining backward compatible with legacy devices.

A new physical layer (PHY) preamble may provide a receiver with information to synchronize (e.g., in terms of time, receive (RX) gain and frequency) with a base station, determine the channel response, determine the length of the transmission, and determine modulation and bandwidth characteristics.

In order to support both new and legacy devices, preamble structures may include a combination of the following characteristics: i) Having a unified, single preamble format for all important PHY modes, such as single-user MIMO, transmit beam-forming, DL-SDMA and UL-SDMA. ii) Having a robust carrier sensing and channel estimation performance. iii) Providing information that allows legacy devices to defer their transmissions for a specified amount of time. iv) Supporting bandwidths larger than 40 MHz. v) Supporting more than four space-time streams. vi) Supporting a receiver design as close as possible to the receivers that are in compliance with the IEEE 802.11n. vii) Supporting auto-detection between the IEEE 802.11a, the IEEE 802.11n (both Mixed Mode (MM) and Greenfield (GF) mode) and a new preamble. viii) Supporting detection and deferral in sub-channels. ix) Having a small overall length.

Figure 4:
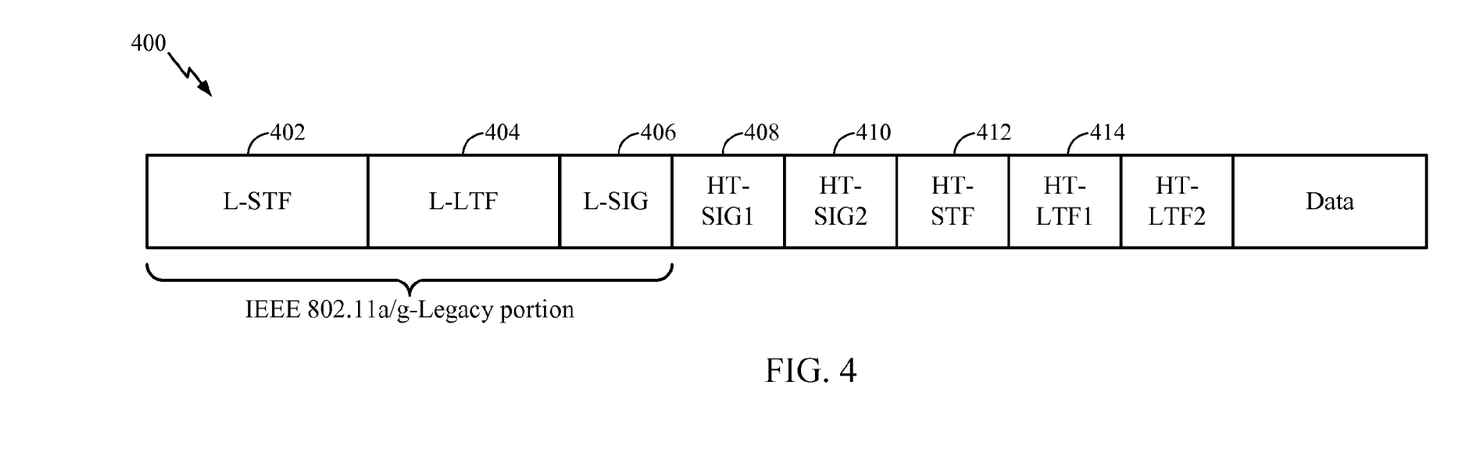
FIG. 4 illustrates a mixed-mode preamble structure in compliance with the Institute of Electrical and Electronics Engineers (IEEE) 802.11n standard.

FIG. 4 illustrates a mixed-mode preamble structure in the IEEE 802.11n standard. As illustrated, the preamble has a legacy signal portion, including short training field (L-STF) 402, long training field (L-LTF) 404, and signal (L-SIG) field 406. The signal portion allows legacy devices that are in compliance with the IEEE 802.11a/g standards to synchronize, determine a channel response, and decode the data in the L-SIG field.

The data in the L-SIG field 406 is signaled using binary phase shift keying (BPSK) modulation and contains information about data rate used for the data portion of the packet, and number of payload bytes. A receiver may compute length of a packet for which to defer any transmissions into the medium based on the information included in the L-SIG field. An IEEE 802.11a/g receiver may expect to see data symbols directly after the L-SIG field 406 which may contain one of the BPSK, Quadrature Phase Shift Keying (QPSK), 16QAM or 64QAM modulations.

In addition, the mixed-mode IEEE 802.11n preamble contains information usable by devices supporting the IEEE 802.11n standard in High Throughput (HT)-SIG1 408 and HT-SIG2 410 symbols. The HT-SIG1 and HT-SIG2 symbols contain information about one or more features in the IEEE 802.11n standard that is used by the packet. The features may include modulation and coding scheme (MCS), short-GI (Guard Interval) or long-GI, 20 MHz or 40 MHz bandwidth, etc. Additionally, the HT-SIG1 field 408 and HT-SIG2 field 410 contain some data that is signaled with $\pi/2$-BPSK as illustrated in FIG. 5.

Figure 5:
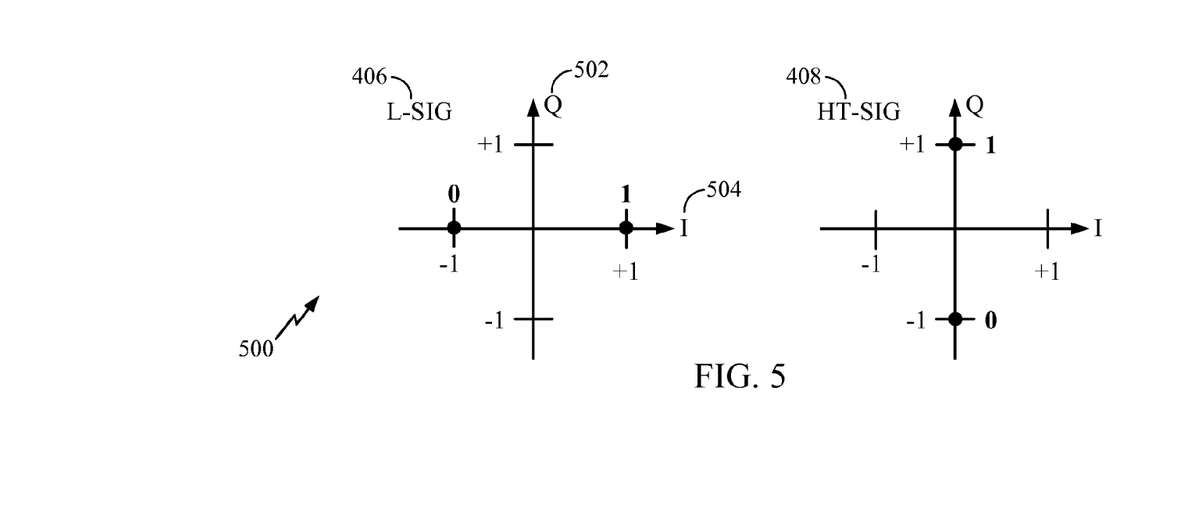
FIG. 5 illustrates example data in legacy-signal (L-SIG) and high throughput-signal (HT-SIG) fields of a preamble that are transmitted with binary phase shift keying (BPSK) and π/2-BPSK modulations.

FIG. 5 illustrates example data in L-SIG and HT-SIG fields of a frame that is transmitted with BPSK or $\pi/2$-BPSK modulations. The data transmitted with $\pi/2$-BPSK modulation is used by a receiver to auto-detect whether a packet is compatible with the IEEE 802.11a/g or the IEEE 802.11n standards.

In order to detect the transmission mode of the received signal (i.e., being in compliance with which one of the IEEE 802.11a/g/n standards), the receiver may check the signal constellation in the slot of time where HT-SIG1 field 408 and HT-SIG2 field 410 exist. If there is more energy on the Q-axis 502 compared to the I-axis 504, the frame may be compatible with the IEEE 802.11n standard. If there is less energy on the Q-axis compared to the I-axis, the frame may be compatible with the IEEE 802.11a/g standards.

The data in the HT-SIG fields 408, 410 may include length of the frame in units of bytes, and an 8-bit cyclic redundancy check (CRC) code to significantly reduce the probability of a false deferral time.

As illustrated in FIG. 4, after the HT-SIG fields, the receiver receives HT-STF (high throughput-short training field) 412 that is used by an IEEE 802.11n receiver to further refine the receive gain. Transmit beamforming, which increases the power of the received signal, is used for transmission of the HT-STF field through the end of the frame. The IEEE 802.11n preamble has a full set of high throughput-long training fields (HT-LTFs) 414 that provide information for channel estimation. In the IEEE 802.11n, up to four HT-LTF 414 fields may be used.

Figure 6:
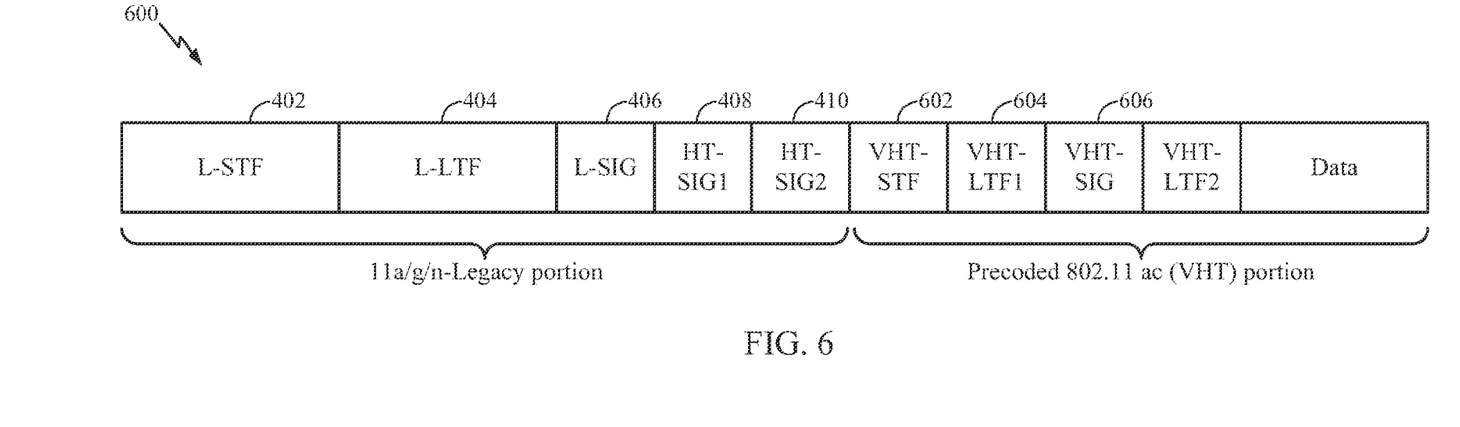
FIG. 6 illustrates a proposed preamble structure that supports very high throughput (VHT) IEEE 802.11ac in addition to the IEEE 802.11n/a/b/g standards, in accordance with certain aspects of the present disclosure.

FIG. 6 illustrates a proposed preamble structure that supports very high throughput (VHT) IEEE 802.11ac in addition to the IEEE 802.11n/a/b/g standards, in accordance with certain aspects of the present disclosure. As illustrated, the proposed preamble structure contains a legacy portion including L-STF 402, L-LTF 404, L-SIG 406, HT-SIG1 408 and HT-SIG2 410 fields.

The legacy portion may provide IEEE 802.11a/g devices with the proper information to defer transmissions in the medium based on data in the L-SIG field 406. The legacy portion also provides devices that support the IEEE 802.11n with the proper information to defer transmissions in the medium based on the HT-SIG1 and HT-SIG2 fields, including the CRC check.

In addition, the preamble structure in FIG. 6 contains a pre-coded portion including a VHT-STF 602, a VHT-LTF1 field 604, a VHT-SIG field 606 and one or more VHT-LTF fields. The pre-coded portion is intended for the devices that support the IEEE 802.11ac standard.

For certain aspects, the VHT devices (i.e., the devices that are in compliance with the IEEE 802.11ac standard) detect an IEEE 802.11ac packet by checking for the existence of a π/2-BPSK signal during the time epoch of the VHT-SIG field 606, which would otherwise be BPSK, QPSK, 16QAM, or 64QAM in the case of an 802.11n packet. The data in VHT-SIG field may be pre-coded and transmitted using SDMA, so that each client receives a unique VHT-SIG field. The VHT-SIG field 606 may be transmitted after the VHT-LTF1 field 604. The receiver determines the channel (channel plus precoding) using the information included in VHT-LTF1 field in order to demodulate and decode the data in the VHT-SIG field correctly. The preamble structure illustrated in FIG. 6 may support up to sixteen VHT-LTF fields.

The preamble structure in FIG. 6 supports DL-SDMA; however, it does not support UL-SDMA. In UL-SDMA, the data in the VHT-SIG field 606 sent by one or more clients may need to be demodulated and decoded at the base station using a channel estimate from each of the clients. Therefore, the VHT-SIG field 606 may need to come at the end of the preamble and not directly after the first VHT-LTF field 604.

Figure 7:
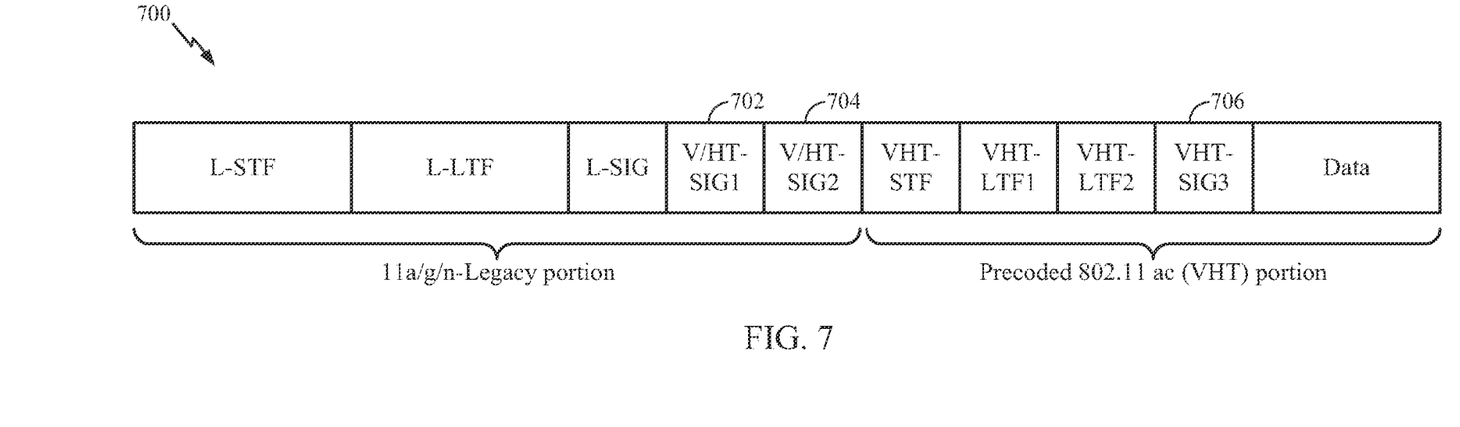
FIG. 7 illustrates a second proposed preamble structure that supports very high throughput (VHT) IEEE 802.11ac in addition to the IEEE 802.11n/a/b/g standards, in accordance with certain aspects of the present disclosure.

FIG. 7 illustrates a second proposed preamble structure that supports very high throughput (VHT) IEEE 802.11ac in addition to the IEEE 802.11n/a/b/g standards, in accordance with certain aspects of the present disclosure. As illustrated, the proposed preamble structure contains a legacy portion including L-STF 402, L-LTF 404, L-SIG 406, V/HT-SIG1 702 and V/HT-SIG2 704 fields. In addition, the preamble structure contains a precoded portion including a VHT-STF 602 and one or more VHT-LTF fields 604 and a VHT-SIG3 field 706.

The preamble illustrated in FIG. 7 may preserve all the characteristics of the preamble presented in FIG. 6, while adding two important features. First, a VHT-SIG field (i.e., VHT-SIG3 706) may occur at the end of the preamble, thereby supporting UL-SDMA. Second, some VHT-SIG information may be carried along with the HT-SIG1 and HT-SIG2 in V/HT-SIG1 702 and V/HT-SIG2 704 fields, respectively. This information may be transmitted in an Omni-fashion, for example the VHT-SIG may be transmitted to all clients using multi-cast.

For certain aspects, the VHT data in V/HT-SIG1 702 and V/HT-SIG2 704 fields are modulated in combination with the π/2-BPSK modulation of the HT-SIG field so as to preserve the ability of an IEEE 802.11n receiver to detect the difference between an IEEE 802.11a/g packet and an IEEE 802.11n packet. This means adding information to the HT-SIG field without changing the actual data demodulated by a π/2-BPSK receiver. The VHT data should be added in a way that an IEEE 802.11n receiver can recognize the π/2-BPSK modulation and properly decode the HT-SIG data and be able to pass the CRC check on the decoded data.

For certain aspects of the present disclosure, the data transmitted in VHT-SIG field may be transmitted utilizing different modulation schemes, such as regular BPSK, scaled BPSK, scaled π/2-BPSK or π/2-PAM (Pulse Amplitude Modulation).

For certain aspects, the data transmitted in VHT-SIG field may be coded over frequency. For example, the VHT-SIG data may only occur on a subset of OFDM frequencies. The VHT-SIG data may also be transmitted over a plurality of OFDM frequencies using repetition coding. In addition, the VHT-SIG data may be spread over one or more frequencies using a sequence such as Walsh code, Golay code, Complementary Code Keying (CCK), etc.

Figure 8A:
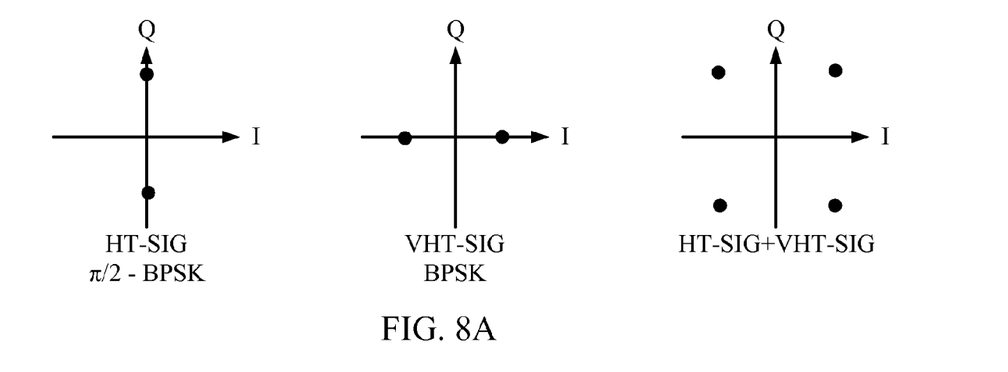
FIGS. 8A, 8B and 8C illustrate examples of transmitting a HT-SIG and a VHT-SIG symbol simultaneously using different modulation schemes, in accordance with certain aspects of the present disclosure.
Figure 8B:
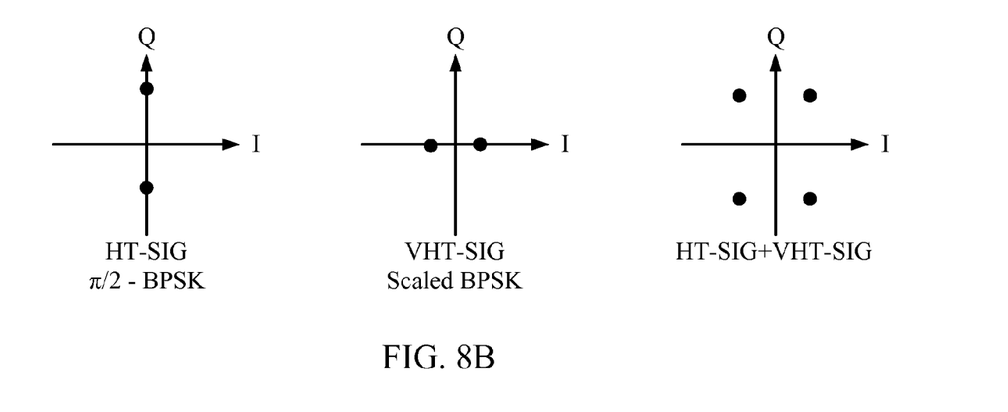
Figure 8C:
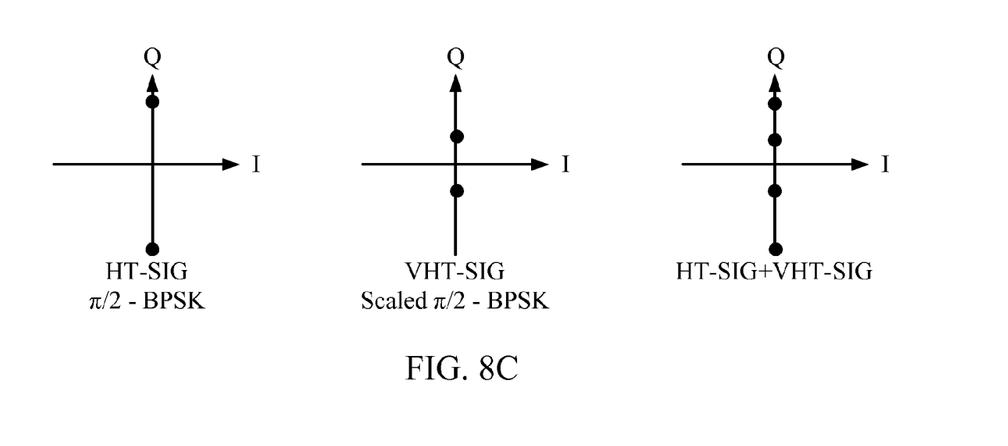

FIGS. 8A, 8B and 8C illustrate examples of transmitting data in an HT-SIG field and a VHT-SIG field simultaneously (e.g., in a V/HT-SIG field 702) using different modulation schemes, in accordance with certain aspects of the present disclosure.

As illustrated in FIG. 8A, BPSK may be used for the VHT-SIG data and may be added directly to the HT-SIG data that is modulate with π/2-BPSK. As long as only some of the OFDM frequencies have VHT-SIG data, the predominant energy in V/HT-SIG field will still be aligned with π/2-BPSK. Therefore, the information in HT-SIG field may still be detectable by the receivers supporting the IEEE 802.11a/b/n/g standards.

As illustrated in FIG. 8B, scaled BPSK may be used to modulate the VHT-SIG data, which may be added to the HT-SIG that is modulated with π/2-BPSK. As long as the scaling factor on the BPSK data is less than one, the predominant energy in V/HT-SIG field may still be aligned with π/2-BPSK. Therefore, the information in HT-SIG field may still be detectable by the receivers supporting the IEEE 802.11a/b/n/g standards.

FIG. 8C illustrates utilizing scaled π/2-BPSK to modulate the VHT-SIG data and adding it to the HT-SIG field that is modulated with π/2-BPSK. As long as the scaling factor on the VHT data is less than 0.5, the combined π/2-BPSK (or π/2-PAM) will still produce the original HT-SIG data when sliced along the Q=0 boundary. Clearly, all energy is aligned with π/2-BPSK; therefore, detection of an IEEE 802.11n packet is preserved.

Figure 9:
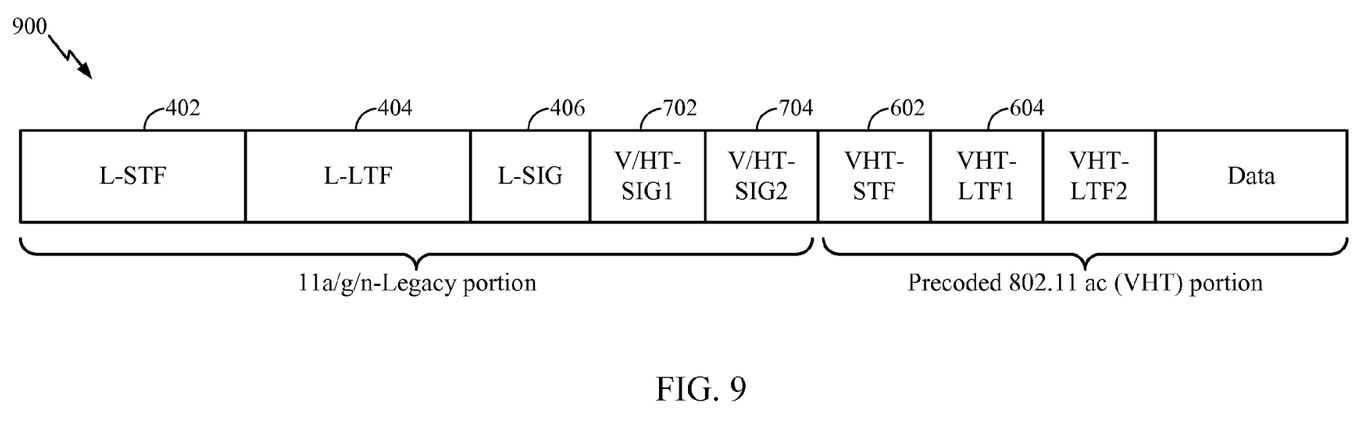
FIG. 9 illustrates a third proposed preamble structure that supports very high throughput (VHT) IEEE 802.11ac in addition to the IEEE 802.11n/a/b/g standards, in accordance with certain aspects of the present disclosure.

FIG. 9 illustrates a third proposed preamble structure that supports very high throughput (VHT) IEEE 802.11ac in addition to the IEEE 802.11n/a/b/g standards, in accordance with certain aspects of the present disclosure. As illustrated, the proposed preamble structure contains a legacy portion including L-STF 402, L-LTF 404, L-SIG 406, V/HT-SIG1 702 and V/HT-SIG2 704 fields. In addition, the preamble structure contains a precoded portion including a VHT-STF 602 and one or more VHT-LTF fields 604. In this preamble structure, all the characteristics of the preambles in FIGS. 6 and 7 are satisfied, except that the VHT-SIG data is only sent in an Omni-fashion to all the clients in V/HT-SIG1 702 and V/HT-SIG2 704 fields.

Figure 10:
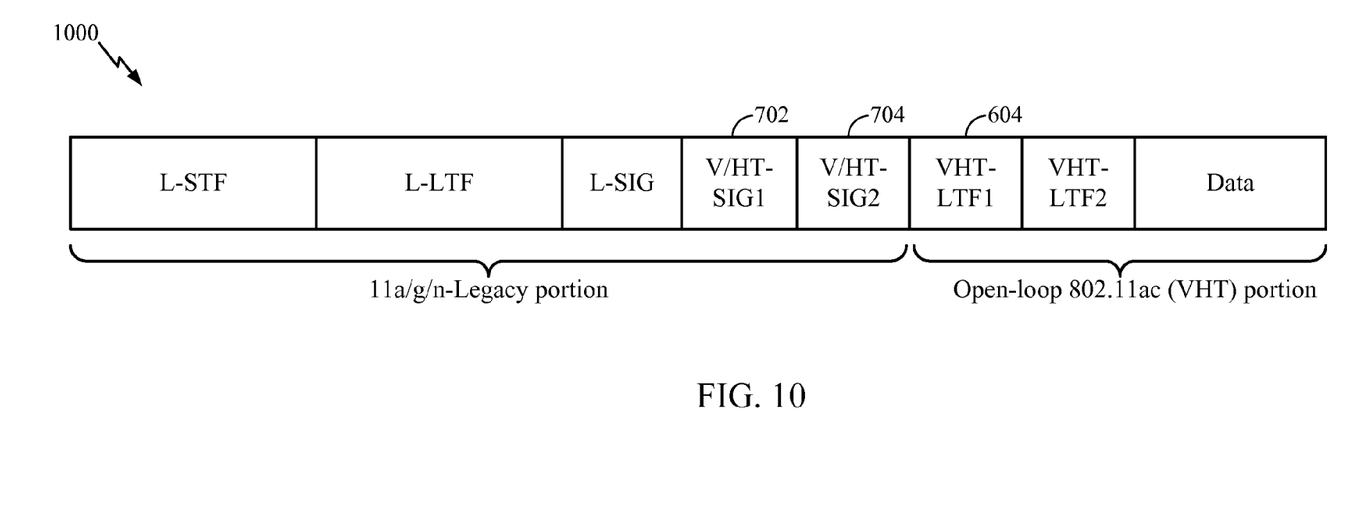
FIG. 10 illustrates a fourth proposed preamble structure that supports very high throughput (VHT) IEEE 802.11ac in addition to the IEEE 802.11n/a/b/g standards, in accordance with certain aspects of the present disclosure.

FIG. 10 illustrates a fourth proposed preamble structure that supports very high throughput (VHT) IEEE 802.11ac standard in addition to the IEEE 802.11n/a/b/g standards, in accordance with certain aspects of the present disclosure. As illustrated, the proposed preamble structure contains a legacy portion including L-STF 402, L-LTF 404, L-SIG 406, V/HT-SIG1 702 and V/HT-SIG2 704 fields. In addition, the preamble structure contains another portion including one or more VHT-LTF fields 604. This preamble structure does not support pre-coding, SDMA or beam-forming, since a short training field (i.e., VHT-STF) is not available in this structure. However, this preamble is quite short and efficient compared to the previous preambles. Note that the V/HT-SIG fields 702, 704 carry the information needed by a receiver to understand which VHT features are supported/utilized in this frame.

Figure 11:
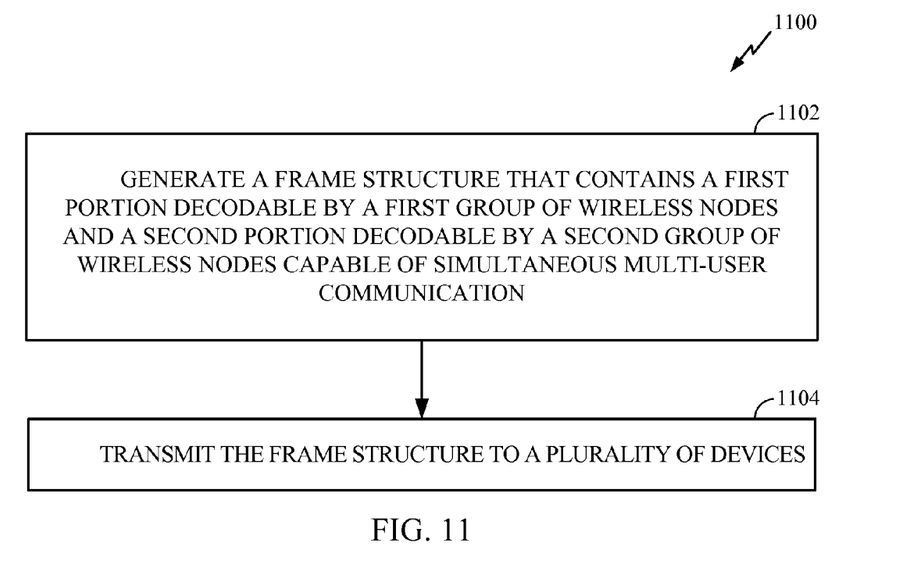
FIG. 11 illustrates example operations for generating a preamble structure that supports a plurality of standards, in accordance with certain aspects of the present disclosure.

FIG. 11 illustrates example operations 1100 for generating a preamble structure that supports a plurality of standards, in accordance with certain aspects of the present disclosure. At 1102, a frame structure is generated that contains a first portion decodable by a first group of wireless nodes and a second portion decodable by a second group of wireless nodes capable of simultaneous multi-user communication. At 1104, the frame structure is transmitted to a plurality of devices.

Figure 12:
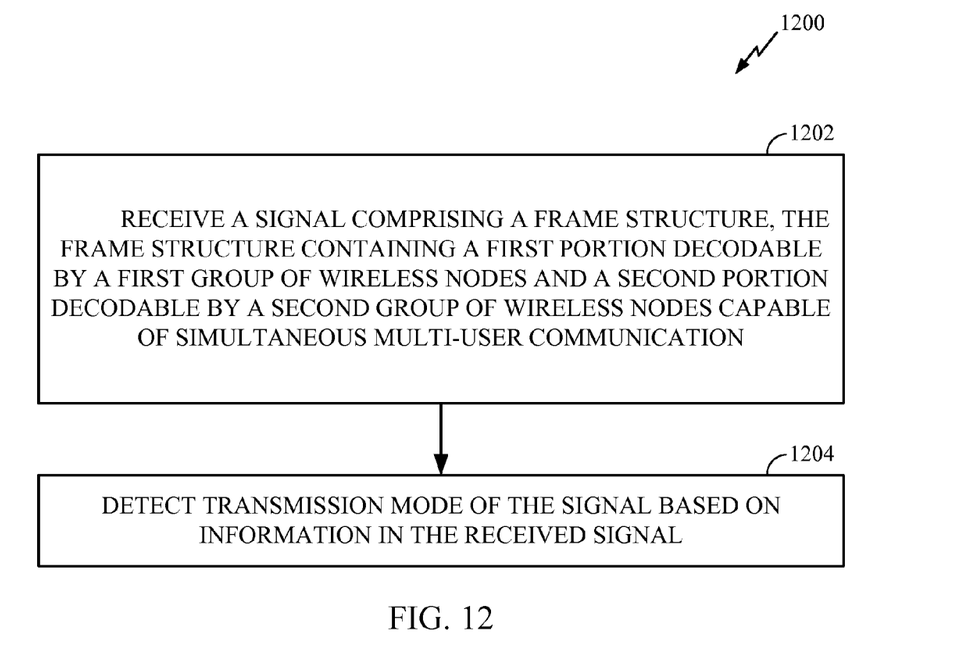
FIG. 12 illustrates example operations for detecting a transmission mode of a signal based on the information in a preamble structure, in accordance with certain aspects of the present disclosure.

FIG. 12 illustrates example operations 1200 for detecting transmission mode of a signal based on the information received in a preamble structure, in accordance with certain aspects of the present disclosure. At 1202, a signal is received comprising a frame structure, the frame structure containing a first portion decodable by a first group of wireless nodes and a second portion decodable by a second group of wireless nodes capable of simultaneous multi-user communication. At 1204, transmission mode of the signal is detected based on information in the received signal.

Figure 11A:
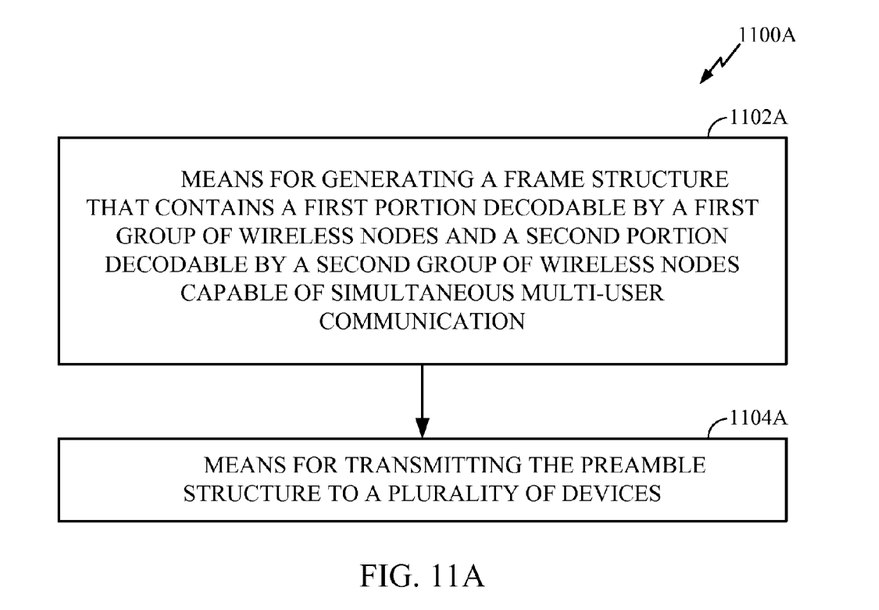
FIG. 11A illustrates example components capable of performing the operations shown in FIG. 11.
Figure 12A:
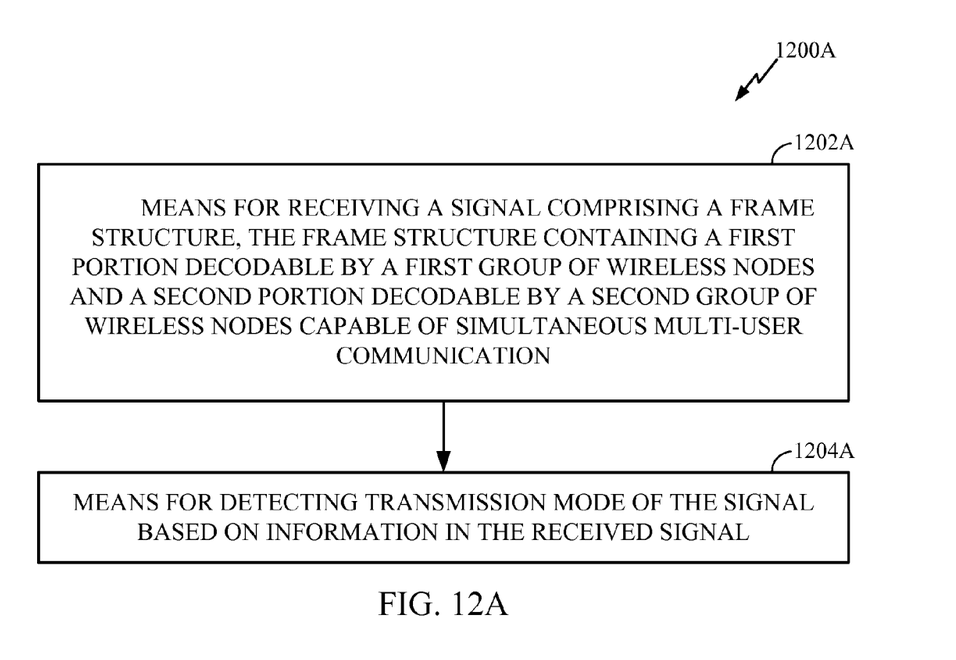
FIG. 12A illustrates example components capable of performing the operations shown in FIG. 12.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 1102-1104 in FIG. 11 correspond to circuit blocks 1102A-1104A illustrated in FIG. 11A. In addition, blocks 1202-1204 in FIG. 12 correspond to circuit blocks 1202A-1204A illustrated in FIG. 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray° disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to embodiments of the present invention, other and further embodiments of the invention may be devised without departing from the basic scope thereof, and the scope thereof is determined by the claims that follow.

What is claimed is:

1. A method for wireless communications, comprising:
generating a frame structure for a packet that contains a first portion decodable by a first group of wireless nodes and a second portion decodable by a second group of wireless nodes capable of simultaneous multi-user communication, wherein the first portion of the packet comprises at least one field comprising high throughput signal (HT-SIG) data and very high throughput signal (VHT-SIG) data for simultaneous transmission; and
transmitting the packet having the frame structure, wherein the HT-SIG data and the VHT-SIG data of the at least one field of the first portion of the packet are modulated using different modulation schemes and are transmitted simultaneously and wherein a scaling factor of the VHT-SIG data is selected to permit the first group of nodes to detect the HT-SIG data while the second group of nodes detects the VHT-SIG data.

2. The method of claim 1, wherein the VHT-SIG data is modulated using scaled Binary Phase Shift Keying (BPSK) and wherein the HT-SIG data is modulated using $\pi/2$-BPSK and wherein the scaling factor of the BPSK VHT-SIG data is less than one to permit the first group of nodes to detect the HT-SIG data while the second group of nodes detects the VHT-SIG data.

3. The method of claim 1, wherein the VHT-SIG data is modulated using scaled $\pi/2$-Binary Phase Shift Keying ($\pi/2$-BPSK) and wherein the HT-SIG data is modulated using $\pi/2$-BPSK and wherein the scaling factor of the $\pi/2$-BPSK VHT-SIG data is less than 0.5 to permit the first group of nodes to detect the HT-SIG data while the second group of nodes detects the VHT-SIG data.

4. An apparatus for wireless communications, comprising:
a circuit configured to generate a frame structure for a packet that contains a first portion decodable by a first group of wireless nodes and a second portion decodable by a second group of wireless nodes capable of simultaneous multi-user communication, wherein the first portion comprises at least one field comprising high throughput signal (HT-SIG) data and very high throughput signal (VHT-SIG) data for simultaneous transmission; and
a transmitter configured to transmit a packet having the frame structure, wherein the HT-SIG data and the VHT-SIG data of the at least one field of the first portion of the packet are modulated using different modulation schemes and are transmitted simultaneously and wherein a scaling factor of the VHT-SIG data is selected to permit the first group of nodes to detect the HT-SIG data while the second group of nodes detects the VHT-SIG data.

5. The apparatus of claim 4, wherein the VHT-SIG data is modulated using scaled Binary Phase Shift Keying (BPSK) and wherein the HT-SIG data is modulated using $\pi/2$-BPSK and wherein the scaling factor of the BPSK VHT-SIG data is less than one to permit the first group of nodes to detect the HT-SIG data while the second group of nodes detects the VHT-SIG data.

6. The apparatus of claim 4, wherein the VHT-SIG data is modulated using scaled $\pi/2$-Binary Phase Shift Keying ($\pi/2$-BPSK) and wherein the HT-SIG data is modulated using $\pi/2$-BPSK and wherein the scaling factor of the $\pi/2$-BPSK VHT-SIG data is less than 0.5 to permit the first group of nodes to detect the HT-SIG data while the second group of nodes detects the VHT-SIG data.

7. A method for wireless communications, comprising:
generating a frame structure for a packet that contains a first portion decodable by a first group of wireless nodes and a second portion decodable by a second group of wireless nodes capable of simultaneous multi-user communication, wherein the first portion of the packet comprises at least one field comprising high throughput signal (HT-SIG) data and very high throughput signal (VHT-SIG) data for simultaneous transmission; and
transmitting the packet having the frame structure, wherein the HT-SIG data and the VHT-SIG data of the at least one field of the first portion of the packet are modulated using different modulation schemes and are transmitted simultaneously, wherein the VHT-SIG data is modulated using Binary Phase Shift Keying (BPSK) using OFDM frequencies and wherein the HT-SIG data is modulated using π/2-BPSK and only some of OFDM frequencies include the VHT-SIG data to permit the first group of nodes to detect the HT-SIG data while the second group of nodes detects the VHT-SIG data.

8. The method of claim 7, wherein the first portion of the packet comprises a legacy short training field (L-STF), a long training field (L-LTF) and a legacy signal field (L-SIG).

9. The method of claim 7, wherein the first group of nodes are in compliance with at least one of the Institute of Electrical and Electronics Engineers (IEEE) 802.11a/b/n/g standards and the second group of nodes are in compliance with the IEEE 802.11ac standard.

10. The method of claim 7, wherein the second group of nodes is a subset of the first group of nodes.

11. The method of claim 7, wherein the VHT-SIG data of the at least one field of the first portion of the packet that also includes HT-SIG data is transmitted after one or more VHT-LTFs (Long Training Fields).

12. The method of claim 7, wherein the VHT-SIG data of the at least one field of the first portion of the packet that also includes HT-SIG data is transmitted over one or more subcarriers.

13. The method of claim 12, wherein the VHT-SIG data of the at least one field of the first portion of the packet that also includes HT-SIG data is spread over the one or more subcarriers using a sequence, wherein the sequence comprises a Walsh code, a Golay code or a complementary code keying (CCK).

14. The method of claim 12, wherein the VHT-SIG data of the at least one field of the first portion of the packet that also includes HT-SIG data is transmitted over one or more subcarriers.

15. The method of claim 14, wherein the VHT-SIG data of the at least one field of the first portion of the packet that also includes HT-SIG data is spread over the one or more subcarriers using a sequence, wherein the sequence comprises a Walsh code, a Golay code or a complementary code keying (CCK).

16. The method of claim 12, wherein the VHT-SIG data of the at least one field of the first portion of the packet that also includes HT-SIG data is transmitted after one or more VHT-LTFs (Long Training Fields).

17. The method of claim 7, wherein the second portion of the packet comprises a very high throughput short training field (VHT-STF), at least one VHT long training field (VHT-LTF) and a VHT signal field (VHT-SIG).

18. The method of claim 17, wherein data in the VHT-SIG field of the second portion of the packet is pre-coded so that each of the wireless nodes in the second group of wireless nodes receives a VHT-SIG field which is different from the VHT-SIG field received by any of the other wireless nodes in the second group of wireless nodes.

19. The method of claim 17, wherein the VHT-SIG field of the second portion of the packet is transmitted using Spatial Division Multiple Access (SDMA).

20. The method of claim 17, wherein the VHT-SIG field of the second portion of the packet is transmitted after one of the VHT long training fields (VHT-LTFs).

21. An apparatus for wireless communications, comprising:
a circuit configured to generate a frame structure for a packet that contains a first portion decodable by a first group of wireless nodes and a second portion decodable by a second group of wireless nodes capable of simultaneous multi-user communication, wherein the first portion comprises at least one field comprising high throughput signal (HT-SIG) data and very high throughput signal (VHT-SIG) data for simultaneous transmission; and
a transmitter configured to transmit a packet having the frame structure, wherein the HT-SIG data and the VHT-SIG data of the at least one field of the first portion of the packet are modulated using different modulation schemes and are transmitted simultaneously and wherein the VHT-SIG data is modulated using Binary Phase Shift Keying (BPSK) using OFDM frequencies and wherein the HT-SIG data is modulated using π/2-BPSK and only some of OFDM frequencies include the VHT-SIG data to permit the first group of nodes to detect the HT-SIG data while the second group of nodes detects the VHT-SIG data.

22. A method for wireless communications, comprising:
receiving a signal of a packet comprising a frame structure, the packet having a first portion decodable by a first group of wireless nodes and a second portion decodable by a second group of wireless nodes capable of simultaneous multi-user communication, wherein the first portion comprises at least one field comprising high throughput signal (HT-SIG) data and very high throughput signal (VHT-SIG) data for simultaneous transmission; and
detecting a transmission mode of the signal based on information in the received signal, wherein the HT-SIG data and the VHT-SIG data of the at least one field of the first portion of the packet are modulated using different modulation schemes and are received simultaneously and wherein the VHT-SIG data is modulated using Binary Phase Shift Keying (BPSK) using OFDM frequencies and wherein the HT-SIG data is modulated using π/2-BPSK and only some of OFDM frequencies include the VHT-SIG data to permit the first group of nodes to detect the HT-SIG data while the second group of nodes detects the VHT-SIG data.

23. The method of claim 22, wherein the first portion of the packet comprises a legacy short training field (L-STF), a long training field (L-LTF) and a legacy signal field (L-SIG).

24. The method of claim 22, wherein the second portion of the packet comprises a very high throughput short training field (VHT-STF), at least one VHT long training field (VHT-LTF) and a VHT signal field (VHT-SIG).

25. The method of claim 22, wherein the first group of nodes are in compliance with at least one of the Institute of Electrical and Electronics Engineers (IEEE) 802.11a/b/n/g standards and the second group of nodes are in compliance with the IEEE 802.11ac standard.

26. The method of claim 22, wherein the second group of nodes is a subset of the first group of nodes.

27. An apparatus for wireless communications, comprising:
a receiver configured to receive a signal comprising a packet having a frame structure, the packet having a first portion decodable by a first group of wireless nodes and a second portion decodable by a second group of wireless nodes capable of simultaneous multi-user communication, wherein the first portion comprises at least one field comprising high throughput signal (HT-SIG) data and very high throughput signal (VHT-SIG) data for simultaneous transmission; and a circuit configured to detect a transmission mode of the signal based on information in the received signal, wherein the HT-SIG data and the VHT-SIG data of the at least one field of the first portion of the packet are modulated using different modulation schemes and are received simultaneously and wherein the VHT-SIG data is modulated using Binary Phase Shift Keying (BPSK) using OFDM frequencies and wherein the HT-SIG data is modulated using $\pi/2$-BPSK and only some of OFDM frequencies include the VHT-SIG data to permit the first group of nodes to detect the HT-SIG data while the second group of nodes detects the VHT-SIG data.

* * * * *